United States Patent
Chen et al.

(10) Patent No.: US 9,877,091 B2
(45) Date of Patent: Jan. 23, 2018

(54) OPTICAL NETWORK WITH SMALL-FORM-FACTOR OPTICAL FIBER CROSS-CONNECT MODULE

(71) Applicant: Verizon Patent and Licensing Inc., Arlington, VA (US)

(72) Inventors: David Z. Chen, Dallas, TX (US); Wenjia Wang, Westborough, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 72 days.

(21) Appl. No.: 14/959,445

(22) Filed: Dec. 4, 2015

(65) Prior Publication Data
US 2017/0164076 A1  Jun. 8, 2017

(51) Int. Cl.
  *H04J 14/02*  (2006.01)
  *H04B 10/27*  (2013.01)
  *H04Q 11/00*  (2006.01)

(52) U.S. Cl.
  CPC . *H04Q 11/0067* (2013.01); *H04Q 2011/0015* (2013.01); *H04Q 2011/0018* (2013.01)

(58) Field of Classification Search
  CPC .................................... H04J 14/0238–14/0252
  See application file for complete search history.

(56) References Cited

U.S. PATENT DOCUMENTS

| 4,360,248 A * | 11/1982 | Bickel | G02B 6/2808 |
| | | | 156/158 |
| 4,708,424 A * | 11/1987 | Marhic | G02B 6/2804 |
| | | | 359/900 |
| 6,816,643 B2 * | 11/2004 | Tei | G02B 6/29367 |
| | | | 385/14 |
| 7,577,361 B2 * | 8/2009 | Tanaka | H04J 14/02 |
| | | | 398/69 |
| 2001/0002940 A1 * | 6/2001 | Glance | G02B 5/288 |
| | | | 385/18 |
| 2006/0187986 A1 * | 8/2006 | Jow | H04B 10/40 |
| | | | 372/45.01 |
| 2012/0315040 A1 * | 12/2012 | Dahlfort | H04J 14/0246 |
| | | | 398/58 |
| 2015/0365191 A1 * | 12/2015 | Lee | H04J 14/0246 |
| | | | 398/67 |

(Continued)

OTHER PUBLICATIONS

"Gould Fiber Optics Announces a New Product Offering: 1X3 Polarization Maintaining (PM) Truly Fused Fiber Coupler/Splitter", Industry News, Mar 2013.*

*Primary Examiner* — Shi K Li

(57) ABSTRACT

A system includes an optical fiber cross-connect module with upstream ports and downstream ports, a first set of optical fibers connected from optical line terminals to the upstream ports, and a second set of optical fibers connected to the downstream ports and a customer optical network unit. The optical line terminals provide multiple wavelengths carrying optical signals at different bitrates over the first set of optical fibers. The customer optical network unit includes a tunable filter configured to receive any one of the multiple wavelengths. The optical fiber cross-connect module divides the optical signals received at each of the upstream ports into each of the downstream ports, and the customer optical network unit may be tuned to pass through a particular wavelength from the multiple wavelengths.

20 Claims, 9 Drawing Sheets

(56) References Cited

U.S. PATENT DOCUMENTS

2016/0105253 A1* 4/2016 Liu ................... H04Q 11/0067
  398/67
2016/0216466 A1* 7/2016 Tang ................... G02B 6/4292
2016/0248539 A1* 8/2016 Kaneko ............... H04J 14/0282

* cited by examiner

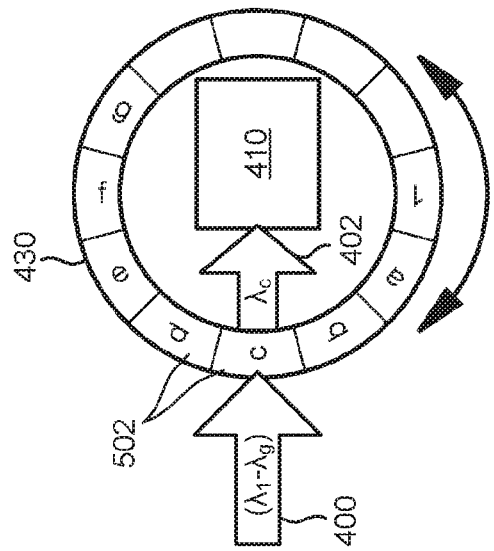
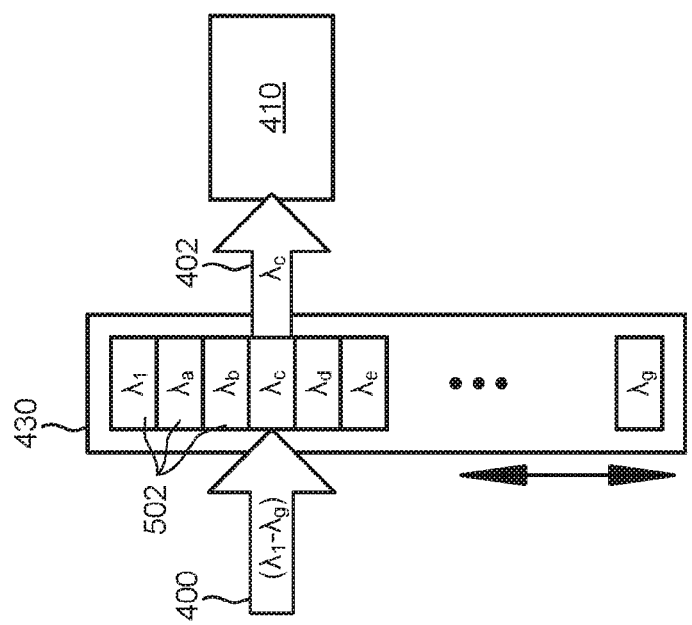
FIG. 5B
FIG. 5A

OPTICAL NETWORK WITH SMALL-FORM-FACTOR OPTICAL FIBER CROSS-CONNECT MODULE

BACKGROUND

A Passive Optical Network (PON) is a fiber network that uses fiber and passive components, such as splitters and combiners, to provide signals from a source. For example, as described in IEEE 802.3ah, one type of PON has a point-to-multipoint network architecture in which an optical splitter distributes a signal from optical fiber to multiple premises. In contrast, an active optical network may use active components, such as amplifiers, repeaters, or shaping circuits, that require additional power. PONs cost significantly less than those networks using active components, but typically provide limited flexibility and a shorter range of coverage.

BRIEF DESCRIPTION OF THE DRAWINGS

FIGS. 5A and 5B illustrate exemplary arrangements of a receiver and a tunable optical filter in the ONU of FIG. 2, according to implementations described herein;

DETAILED DESCRIPTION OF PREFERRED EMBODIMENTS

The following detailed description refers to the accompanying drawings. The same reference numbers in different drawings may identify the same or similar elements.

Systems and methods described herein provide a small-form-factor optical fiber cross-connect module for an optical network. The cross-connect module can be used in conjunction with an optical network unit (ONU) to provide a reliable passive optical network that can provide wavelength multiplexing without use of optical filters in the optical network. According to another implementation the systems and methods provide a hybrid passive optical network. A hybrid passive optical network may maintain the benefits of a conventional PON (such as cost savings, reliability, and simplicity) while providing some of the advantages of an active optical network (such as flexibility, dynamic modifications, etc.). A PON typically provides a dedicated bitrate to customers over a particular wavelength or range of wavelengths. According to implementations described herein the hybrid PON may provide the flexibility to modify services within a passive network system.

According to an implementation described herein, a system includes an optical fiber cross-connect module with a fiber mesh that connects upstream ports and downstream ports. A first set of optical fibers connect optical line terminals to the upstream ports, and a second set of optical fibers connect the downstream ports to a customer optical network unit. The optical line terminals provide multiple wavelengths carrying optical signals at different bitrates over the first set of optical fibers. The different bitrates may provide different levels of services to which a particular customer may subscribe. The customer optical network unit includes a tunable filter configured to receive any one of the multiple wavelengths. The optical fiber cross-connect module divides the optical signals received at each of the upstream ports into each of the downstream ports, and, conversely, divides optical signals received at each of the downstream ports into each of the upstream ports. The customer optical network unit may be tuned to pass through a particular wavelength from the multiple wavelengths that corresponds to the customer's subscription.

Figure 1:
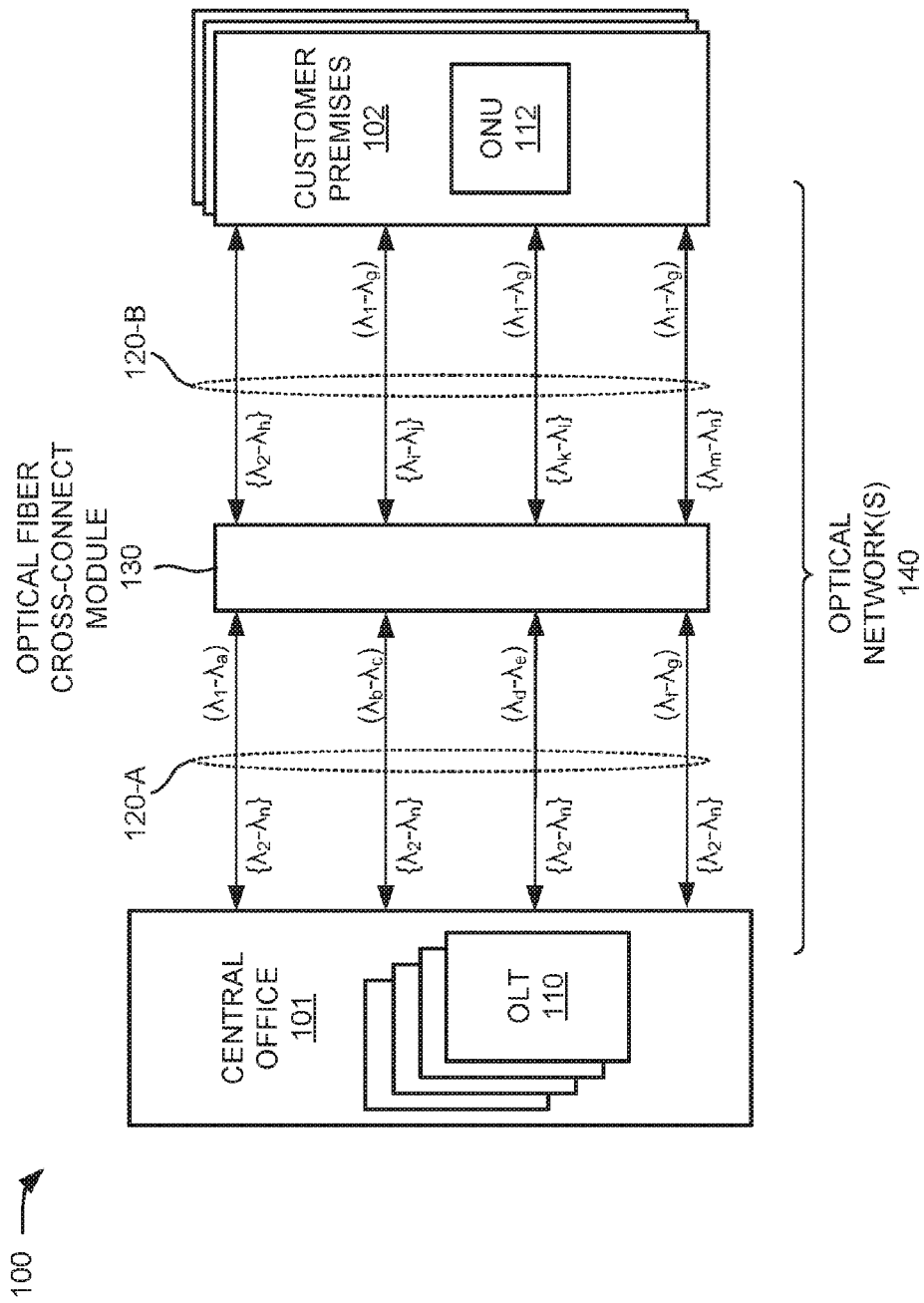
FIGS. 1 and 2 illustrate an exemplary environment in which systems and methods described herein may be implemented.

FIG. 1 is a block diagram illustrating an exemplary environment 100 in which the concepts described herein may be implemented. As shown in FIG. 1, a central office 101 is connected to customer premises 102 using multiple paths. Optical line terminals (OLTs) 110 in central office 101 and optical network units (ONUs) 112 in customer premises 102 may be connected to one or more pathways 120, shown as separate portions 120-A and 120-B (hereafter referred to individually or generically as "pathway 120"). Pathways 120 may be associated with separate optical networks 140 that connect central office 101 and customer premises 102.

Central office 101 may include one or more devices, such as computer devices and/or server devices, which ingest content, store content, format content, and/or deliver content to customer premises 102. For example, central office 101 may provide television channels and/or other type of content from a video content delivery system. Central office 101 may include one or more OLTs 110. Furthermore, central office 101 may provide a connection service to optical network 140 for customer premises 102.

Customer premises 102 may include a multiple dwelling unit or single dwelling unit. A multiple dwelling unit may include, for example, apartments, offices, condominiums, and/or other types of occupancy units that are aggregated in a high-rise or another type of building. A single dwelling unit may include attached town houses, single detached houses, condominiums, and/or other types of horizontally aggregated occupancy units. Customer premises 102 may include one or more ONUs 112.

OLT 110 may correspond, for example, to an optical blade or card associated with optical signals carried via a PON, such as optical network 140, via pathway 120. For example, OLT 110 communicates with customer premises 102 via optical network 140 to provide data and/or services to the customer premises 102. Functions of OLT 110 may be governed by one or more controllers (not depicted).

Optical network unit (ONU) 112 may include a device to terminate pathways 120 at customer premises 102. ONU 112 may demultiplex incoming optical signals into component parts (such as voice telephone, television, and Internet), and provide the signals to user devices in customer premises. ONU 112 may also transmit outgoing signals from devices in customer premises over pathways 120.

Pathways 120 may include, for example, a fiber to transmit a corresponding wavelength and connectors to couple to devices in central office 101 (e.g., OLT 110), customer premises 102 (e.g., ONU 112), and cross-connect module 130. Pathway 120 may include various other components not specifically described herein.

Each of OLTs 110 may be associated with a separate wavelength or range of wavelengths (e.g., wavelengths $\lambda_1$-$\lambda_a$, wavelength $\lambda_b$-$\lambda_c$, etc.) for sending downstream signals. Similarly, ONUs 112 at customer premises 102 may be associated with different separate wavelengths or ranges of wavelengths (e.g., wavelengths $\lambda_2$-$\lambda_h$, wavelengths $\lambda_i$-$\lambda_j$, etc.) for sending upstream signals. The different downstream wavelengths associated with OLTs 110 initially may be transmitted via different pathways 120-A. For example, as illustrated in FIG. 1, one pathway 120-A may carry wavelengths $\lambda_1$-$\lambda_a$, and a separate pathway 120-A may provide a different path for carrying wavelengths $\lambda_b$-$\lambda_c$. Similarly, the different upstream wavelengths associated with ONUs 112 initially may be transmitted via different pathways 120-B. For example, as also illustrated in FIG. 1, one pathway 120-B may carry wavelengths $\lambda_2$-$\lambda_g$, and a separate pathway 120-B may provide a different path for carrying wavelengths $\lambda_i$-$\lambda_j$. According to implementations herein, an optical fiber cross-connect module 130 (referred to hereafter simply as "cross-connect module 130") may be inserted between central office 101 and customer premises 102 to cross-connect multiple pathways 120-A and 120-B, such that any downstream wavelength of a pathway 120-A may be transmitted over each portion of pathway 120B and any upstream wavelength of a pathway 120-B may be transmitted over each portion of pathway 120A.

Cross-connect module 130 may include a fiber cross-connect that links each fiber from pathway 120-A with each fiber from pathway 120-B. In one implementation, cross-connect module 130 may have a relatively small form-factor (e.g., thumb-size). Cross-connect module 130 may be inserted along pathway 120 at central office 101, at customer premises 102, or anywhere between central office 101 and customer premises 102. According to implementations described herein, cross-connect module 130 does not include optical filters, so that signal degradation is minimized. Cross-connect module 130 is described further in connection with FIG. 3.

Still referring to FIG. 1, optical network 140 may include one or more components associated with a PON. For example, optical network 140 may include a fiber and various passive optical components such as a splitter, a filter, an attenuator, a modulator, etc. Optical network 140 may also include a component to couple to a device associated with a customer premises, such as an ONU. Generally, pathways 120 and cross-connect module 130 for optical network 140 may be considered a passive optical distribution network, in that no amplification, powered optical splitting, or active filtering is used to transmit signals across optical network 140. However, according to implementations described herein, additional network components typically associated with an active optical network may also be linked to pathways 120 via cross-connect module 130. For example, optical amplifiers (e.g., an Erbium Doped Fiber Amplifier (EDFA) or a Raman amplifier) may be integrated into optical network 140 via one or more ports of cross-connect module 130. Thus, optical network 140 may be referred to as a hybrid PON.

Although FIG. 1 illustrates exemplary components of environment 100, in other implementations, environment 100 may include fewer components, different components, differently arranged components, and/or additional components than those depicted in environment 100. Also, functions described as being performed by respective separate components of environment 100 may be performed by a single component, or a single function may be performed by multiple components of environment 100. Furthermore, although pathways 120-A and 120-B are shown connected to cross-connect module 130 between central office 101 and customer premises 102, cross-connect module 130 may be located at different or multiple locations in optical network 140.

Furthermore, in FIG. 1, the depicted particular arrangement and number of components of environment 100 are illustrated for simplicity. In practice, there may be more or fewer OLTs 110, pathways 120, cross-connect modules 130, and optical networks 140 than depicted in FIG. 1. For example, there may be tens or even hundreds of OLTs 110 associated with a single central office 101.

Figure 2:
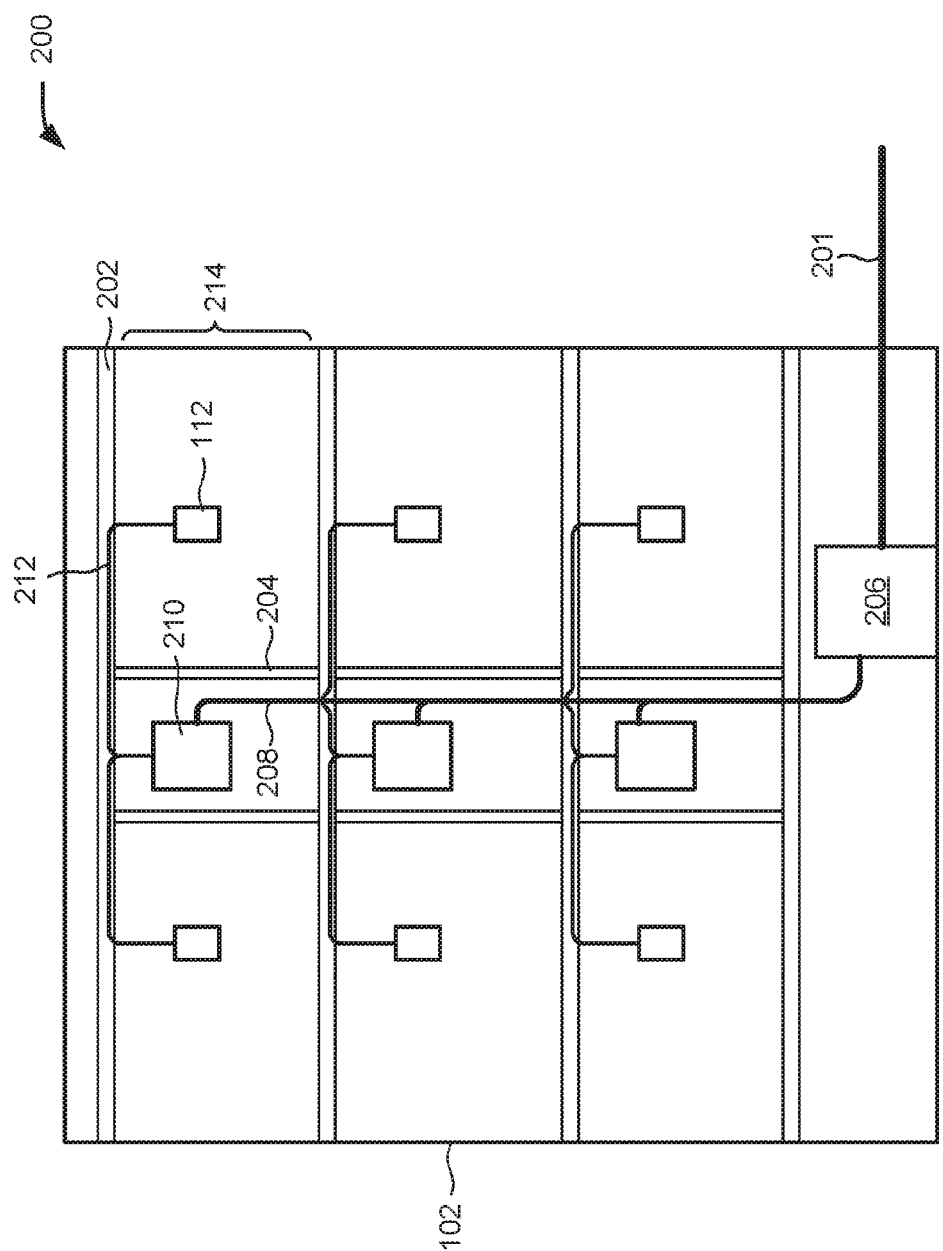

FIG. 2 shows a portion 200 of environment 100. Portion 200 may include one of customer premises 102 configured as a multiple dwelling unit. Depending on the implementation, portion 200 may include additional, fewer, or different components than those illustrated in FIG. 2, such as, for example, facilities for housing amplifiers in a hybrid PON environment.

Feeder optical fiber cable 201 may include optical fiber cable bundles that interconnect a multiple dwelling unit complex and/or a single dwelling unit complex to OLTs 110 in central office 101. In one implementation, feeder optical fiber 201 may be a single mode fiber with a standard diameter of 125 microns. For example, attributes of feeder optical fiber 201 may comply with International Telecommunications Union recommendation ITU-T G.652.D (11/2009).

As shown in FIG. 2, customer premises 102 may include a floor/ceiling 202, a wall 204, a fiber distribution hub 206, a distribution cable bundle 208, a fiber distribution terminal 210, a drop cable 212, an occupancy unit 214, and ONU 112. In FIG. 2, some components of the multiple dwelling unit of customer premises 102 are omitted for the sake of simplicity (e.g., stairs, doors, elevators, etc.). In addition, depending on the implementation, customer premises 102 may include additional, fewer, or different components than those illustrated in FIG. 2. For example, in some implementations, fiber distribution terminal 210 may be connected to fiber distribution hub 206 through another component, such as a collector box that receives ribbon cables, and provides the ribbon cables connectivity to fiber distribution terminals.

Ceiling/floor 202 and wall 204 may partition space within the multiple dwelling unit of customer premises 102 into multiple occupancy units. Fiber distribution hub 206 may include an enclosure (e.g., a plastic or metal cabinet) to receive feeder optical fiber cable 201, split an optical signal on an optical fiber within optical fiber cable 201 into multiple optical signals, convey the split optical signals to fiber distribution cables, collect the fiber distribution cables into distribution cable bundle 208, and provide distribution cable bundle 208 to fiber distribution terminals 210 or to ONUs 112.

Distribution cable bundle 208 may include riser cables that carry optical fibers from fiber distribution hub 206 to fiber distribution terminal 210. In some implementations, distribution cable bundle 208 may be tapered as it is routed vertically through the multiple dwelling unit of customer premises 102 and as fiber distribution cables are branched from distribution cable bundle 208 to feed into one or more of fiber distribution terminal 210. Fiber distribution terminal 210 may include an enclosure to receive a fiber distribution cable from distribution cable bundle 208.

Drop cable 212 may include an optical fiber that carries an optical signal from a fiber distribution cable in fiber distribution terminal 210 to ONU 112. Typically, drop cable 212 may be installed in a raceway that is placed along the ceiling of a hallway, in a conduit, in a duct, etc.

ONU 112, which may also be known as an optical network terminal, may receive optical signals via drop cable 212 and convert the received optical signals into electrical signals that are further processed or carried over, for example, copper wires to one or more occupancy units. In some implementations, ONU 112 may be placed within an occupancy unit 214, and devices that use services offered by central office 101 may be directly connected to optical network unit 112. ONU 112 may receive data and may transfer the data to the appropriate device in occupancy unit 214, such as a set-top box (STB), television, computer, wireless router, telephone, etc. Likewise, ONU 112 may receive data from a device in in occupancy unit 214 and output the data to central office 101 through optical network 140.

Occupancy unit 214 may include a partitioned space that a tenant or an owner of the occupancy unit 214 may occupy. Occupancy unit 214 may house devices that are attached directly or indirectly to ONU 112 to receive services that central office 101 provides.

Systems and methods described herein enable delivering optical signals over multiple wavelengths to ONU 112 via optical network 140. Different wavelengths may be used by a service provider to distinguish service levels, such as different download bitrates. For example, central office 101 may use one set of wavelengths to deliver signals to ONUs 112 at a 2.5 gigabit-per-second (Gbps) bitrate, another set of wavelengths for a 50 Mbps bitrate, a different set of wavelengths for a 40 Gbps bitrate, and still another set of wavelengths for a 100 Gbps bitrate. As described further herein, using cross-connect module 130 in optical network 140 and tunable optical filters at each ONU 112, service providers can offer dynamic wavelength-based service differentiation without use of optical filters in the optical network 140. Since optical filters typically degrade signals, the ability to inject particular wavelengths without filtering through the PON can provide improved signal quality. Using cross-connect module 130 may provide that no wavelength bias is introduced into pathways 120.

In contrast with typical PONs, optical network 140 provides dynamic backup paths, as each of fibers in pathway 120-B include the entire wavelength spectrum of available services. These backup paths may improve reliability as well as enable a service provider to perform upgrades without interruption to the customer.

Cross-connect module 130, in embodiments described herein, can be located at outside of central office 101, providing network design flexibility and saving complexity at central office 101. For example, as described further herein, use of cross-connect module 130 provides a simple way to apply optical amplification (such as EDFA or Raman) at one or more of multiple locations.

Figure 3A:
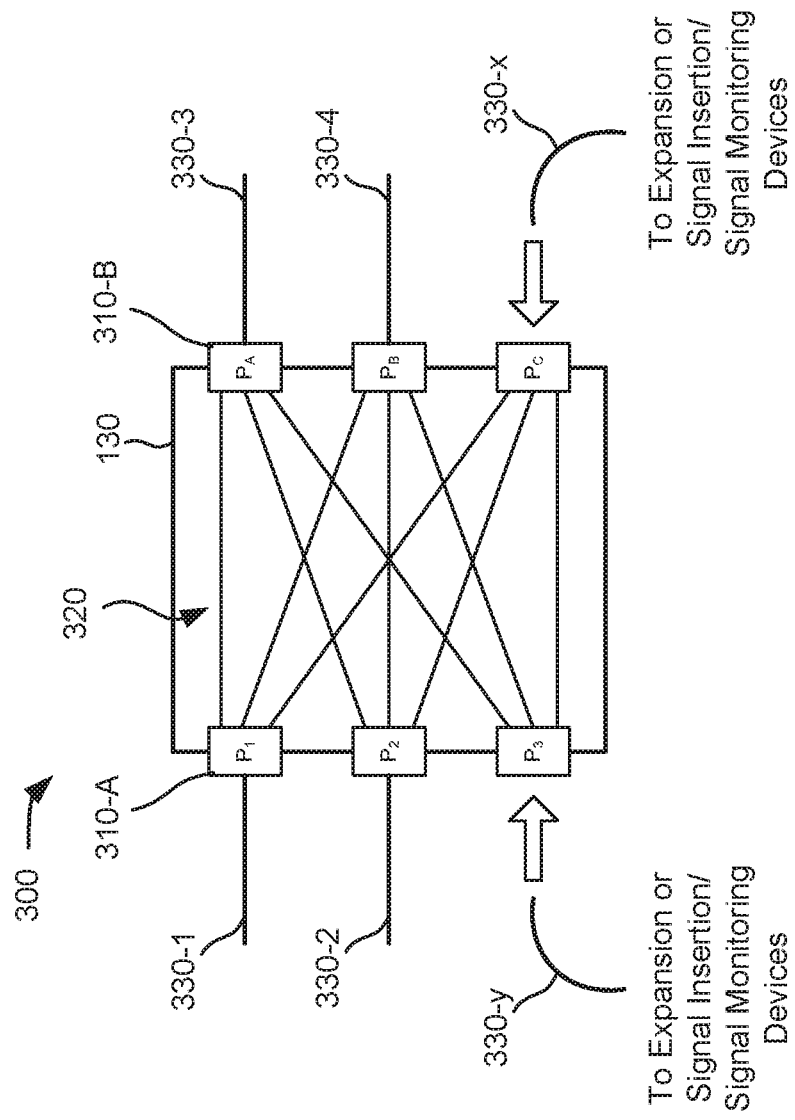
FIG. 3A illustrates a cross-connect module in a portion of the optical network of FIG. 1.

FIG. 3A provides an exemplary schematic of cross-connect module 130 in a portion 300 of the optical network 140. Network portion 300 may include optical fibers 330-1 through 330-4 (referred to generally as "optical fibers 330") that connect to cross-connect module 130. Optical fibers 330 may correspond, for example to pathways 120 and/or feeder optical fiber cable 201. Network portion 300 may be located, anywhere between an ONT 110 in central office 101 and an ONU 112 in customer premises 102, including, for example, within fiber distribution hub 206 or fiber distribution terminal 210.

Cross-connect module 130 may include ports 310, including an upstream set of ports 310-A and a downstream set of ports 310-B. The distinctions of "upstream" and "downstream" used herein are for descriptive purposes only, and are not limiting. Upstream ports 310-A and downstream ports 310-B may be interconnected by a fiber mesh 320. Fiber mesh 320 may include, for example, a fusion splice extending form each port 310 such that each upstream port 310-A is connected to all downstream ports 310-B. For example, as shown in FIG. 3, one upstream port 310-A (e.g., $P_1$) may connect to each of downstream ports 310-B (e.g., $P_A$, $P_B$, and $P_C$) with a fiber splice that distributes optical signals from fiber 330-1 evenly among each among each of the downstream ports 310-B. The other upstream ports 310-A (e.g., $P_2$ and $P_3$) may be similarly connected to each of downstream ports 310-B (e.g., $P_A$, $P_B$, and $P_C$). As also shown in FIG. 3, one downstream port 310-B (e.g., $P_A$) may connect to each of upstream ports 310-B (e.g., $P_1$, $P_2$, and $P_3$) with a fiber splice that distributes optical signals from fiber 330-3 evenly among each among each of the upstream ports 310-A.

In one implementation, ends of optical fibers 330-1 through 330-4 that interface with ports 310 may be configured to match standard connector patterns, such as known multiple-fiber push-on (MPO) connectors. For example, ends of optical fibers 330-1 and 330-2 may include a female guide hole configuration (not shown) to receive alignment pins and/or ferrules from a corresponding side with ports 310-A configured as a male MPO connector. In other implementations, cross-connect module 130 may include a ribbon interface or individual fiber interface. Cross-connect module 130 may be assembled to factory specifications and tested to ensure requirements for optical insertion losses through cross-connect module 130 are met.

Figure 3B:
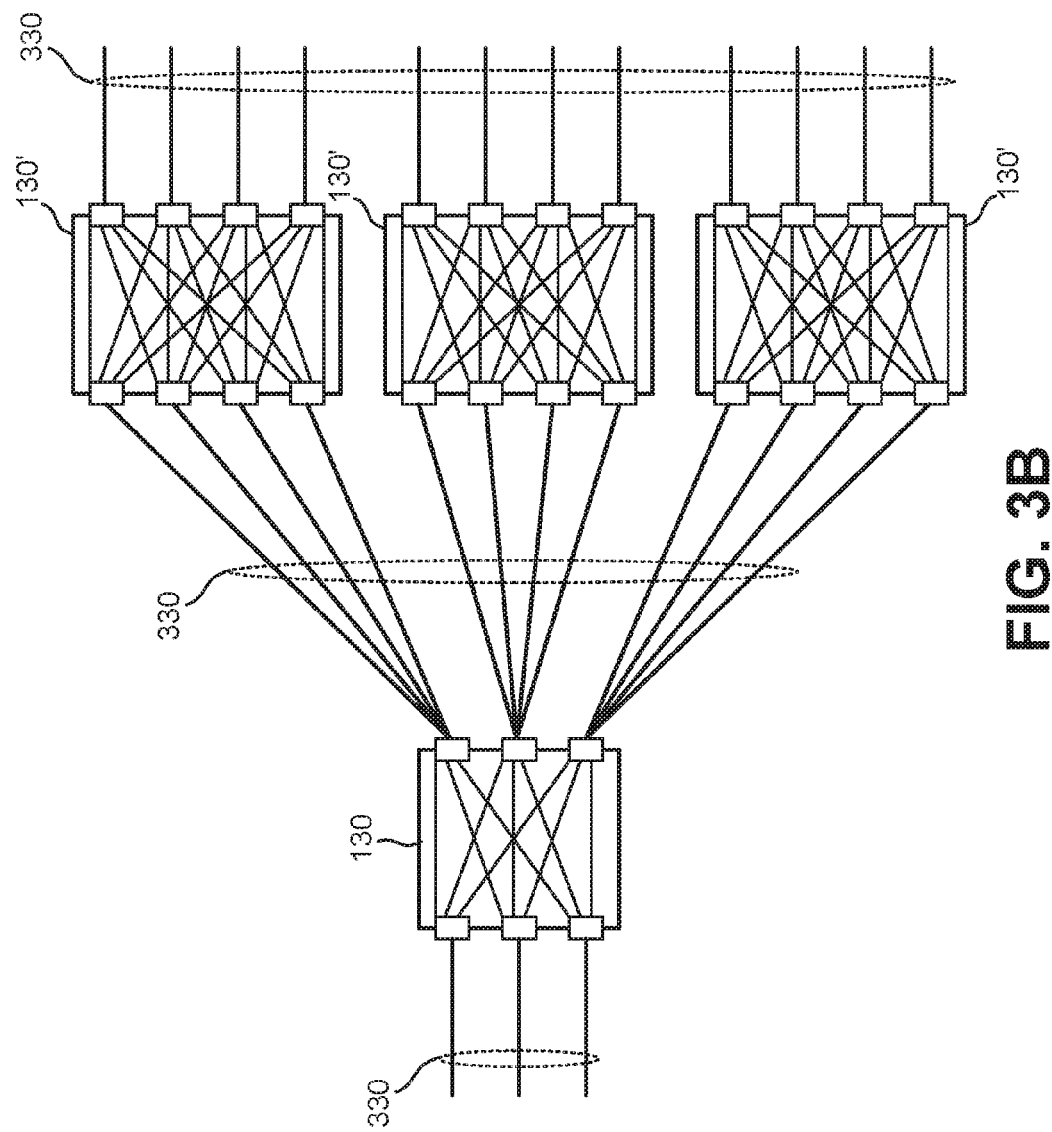
FIG. 3B illustrates multiple cross-connect modules linked in series.

In the example of FIG. 3A, cross-connect module 130 may be a fusion splitter (e.g., fused biconic tapered splitters at each port 310) with three upstream/downstream port pairs 310-A/310-B. In other configurations, another number of port pairs may be used. For example, cross-connect module 130 may be configured with four or twelve upstream/downstream port pairs 310-A/310-B. According to another implementation, if signal power is adequate, multiple cross-connect modules 130 may be installed in series and/or in parallel to achieve a desired mesh ratio (e.g., 1-to-6 upstream/downstream, 1-to-12 upstream/downstream, etc.). For example, as shown in FIG. 3B a cross-connect module 130 with three sets of upstream/downstream ports may be linked to three cross-connect modules 130', each with four sets of upstream/downstream ports, to form a 1-to-12 upstream/downstream ratio. In some implementations, if signal strength through optical fibers 330 is insufficient to support a complete 1-to-12 and 12-to-1 mesh, cross-connect modules 130' may be replaced with power splitters, such as Planar Lightwave Circuit (PLC) splitters. Use of power splitters 130' may provide groupings associated with each power splitter 130', such as grouping for business, consumer, and wireless in customer premises 102.

As shown in FIG. 3A, one or more upstream ports 310-A (e.g., $P_3$) and one or more downstream ports 310-B (e.g., $P_C$) may be left open. Open ports 310 may be reserved for expansion (e.g., service to future customer premises 102 or occupancy units 214 within customer premises 102) and/or connecting other OLTs 110 to customer premises 102. In another implementation, open ports 310 may be used to provide network monitoring of traffic over pathways 120 or signal tapping. For example, in the configuration of FIG. 3A, insertion of a tap line 330-x at one of downstream ports 310-B (e.g., $P_C$) will enable downstream signals from optical fibers 330-1 and 330-2 to be collected simultaneously.

Similarly, insertion of a tap line 330-*y* at one of upstream ports 310-A (e.g., P$_3$) will enable upstream signals from optical fibers 330-3 and 330-4 to be collected simultaneously.

Open ports 310 may also provide access to inject signals into optical network 140, such as optical signals for amplification. For example, an amplifier may be connected to one of upstream ports 310-A (e.g., P$_3$) to boost power, for downstream signals traversing optical fiber 330-3 or 330-4 (e.g., via a Raman amplifier using co-directional pumping). Additionally, or alternatively, contra-directional pumping of a secondary signal through one of downstream ports 310-B (e.g., P$_C$) may be used to improve downstream signals traversing optical fiber 330-1 or 330-2. The use of open ports 310 for co-directional pumping and contra-directional pumping can be reversed to amplify upstream signals through optical fibers 330. In other implementations, open ports 310 may be used with other signal amplification techniques, such as an EDFA. In still other implementations, open ports 310 may be used to inject tracing signals or other types of signals. Thus, the use open ports 310 may enable active optical network practices for optical network 140.

In FIGS. 3A and 3B, the depicted arrangement and number of components of cross-connect module 130 are illustrated for simplicity. In practice, there may be more ports 310 and optical fibers 330 than depicted in FIGS. 3A and 3B. Furthermore, different splitting techniques (other than fusion splitting) may be used to achieve substantially equal signal ratios between upstream and downstream ports 310. In other implementations, signal ratios may be unequal at each port 310. For example, particular ports 310 may be reserved for monitoring and may be configured to receive a smaller proportion of signal strength than the remaining ports 310 (e.g., ports P$_1$, P$_2$, and P$_3$ may be configured to split signal strength 40% to P$_A$, 40% to P$_B$, and 20% to P$_C$).

Figure 4:
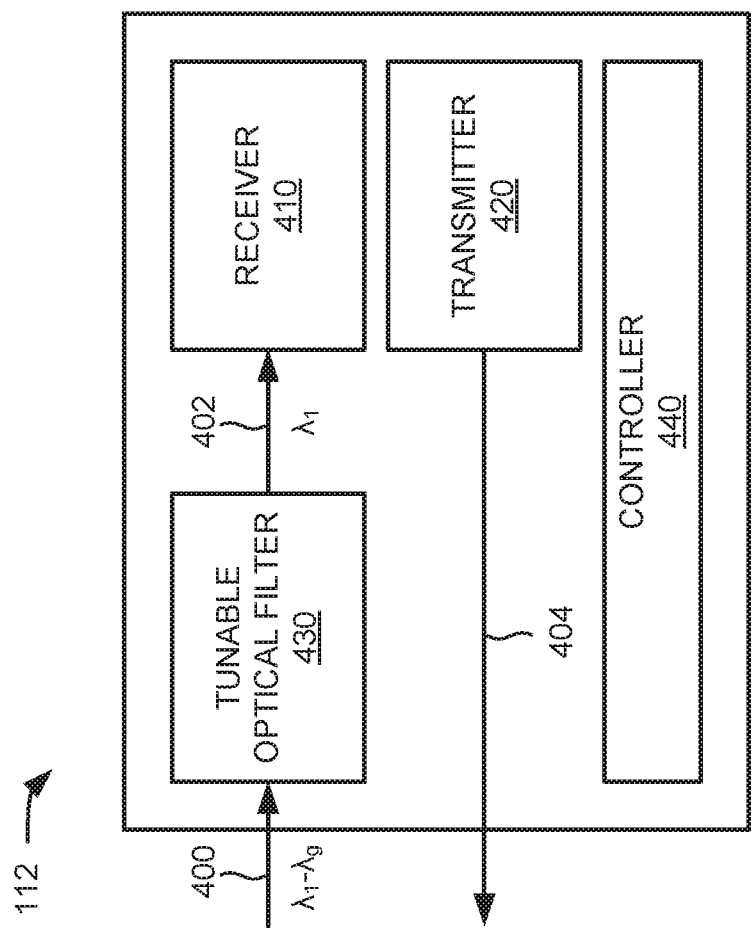
FIG. 4 is a simplified block diagram of an optical network unit (ONU) of FIG. 2, according to an implementation.

FIG. 4 is a block diagram of ONU 112, according to an implementation. As shown in FIG. 4, ONU 112 may include a receiver 410, a transmitter 420, a tunable optical filter 430, and a controller 440.

Receiver 410 may be any device configured to receive and/or process optical data signals. Receiver 410 may receive optical signals 402 that are passed through tunable optical filter 430 and may convert the optical signals to electrical signals for distribution to other devices (e.g., devices in customer premises 102).

Transmitter 420 may be any device configured to transmit optical data signals. Transmitter 420 may receive, for example, electrical signals from other devices (e.g., devices in customer premises 102) and may convert the electrical signals to optical signals 404 for distribution over optical network 140. In the configuration of FIG. 4, transmitter 420 may use a different path 120/fiber 330 to send optical signals 404 than is used to receive optical signals 400.

Tunable optical filter 430 may receive broadband optical signals, such as coarse wavelength division multiplexing (CWDM) signals, as optical signals 400. Optical signals 400 may correspond, for example, to signals from one of optical fibers 330. Particularly, in the configuration of FIG. 3A, incoming optical signals 400 would correspond to signals over optical fibers 330-3 and 330-4 (e.g., including a combined range of wavelengths $\lambda_1$ to $\lambda_g$). Tunable optical filter 430 may filter signals that are unwanted and/or unauthorized for a particular customer from optical signals 400 and provide controlled narrowband optical signals 402 (e.g., only $\lambda_1$) to receiver 410.

In one implementation, tunable optical filter 430 may include a photodiode (PD) receiver or avalanche photodiode (APD) receiver that can be dynamically configured to pass through only selected wavelengths. For example, tunable optical filter 430 may be configured with increments to match a frequency grid for CWDM signals (such as a spectral grid defined in ITU-T G.694.2). Tunable optical filter 430 may be tuned to a particular increment to receive optical signals that correlate to a customer's service plan.

FIGS. 5A and 5B illustrate exemplary arrangements of receiver 410 and tunable optical filter 430, according to implementations described herein. FIG. 5A shows tunable optical filter 430 with a linear arrangement of tuning options 502. FIG. 5B shows tunable optical filter 430 with a radial arrangement of tuning options 502. In both FIGS. 5A and 5B, tuning options 502 may correspond to available wavelengths used in optical network 140. For example, tuning options 502 may correspond to increments of a frequency grid for CWDM signals. Tuning options 502 of tunable optical filter 430 may be positioned with respect to incoming signals 400 on optical fiber 330 to apply a tuned wavelength 402 for receiver 410. Optical filter 430 may be a manually positioned (e.g., by a service technician) or controlled via software (e.g., a service technician using controller 440).

Referring back to FIG. 4, controller 440 may exchange status and control signals with receiver 410, transmitter 420, and tunable optical filter 430 to cause ONU 112 to transmit and/or receive signals via pathways optical network 140. Controller 440 may provide updates, implement configuration settings, monitor, and/or perform other administrative functions for ONU 112. As an example, referring to FIG. 1, controller 440 may be used to configure tunable optical filter 430 for reception of wavelengths $\lambda_1$ via one of pathways 120-B with the exclusion of wavelengths $\lambda_2$ through $\lambda_g$.

In one implementation, tunable optical filter 430 may be provided with a default wavelength setting that may allow communications over optical network 140 for purposes of configuring ONU 112 (e.g., during service installation or upgrade). Tunable optical filter 430 may then be tuned (e.g., by a service provider technician) to allow only a particular wavelength (e.g., that corresponds to a bitrate for the customer's service plan). Controller 440 may also include software to perform other ONU functions and to prevent unauthorized access to other optical signals 400 transmitted on other wavelengths. According to one implementation, controller 440 may respond to queries and/or be configurable within a software-define networking (SDN) environment.

Figure 6:
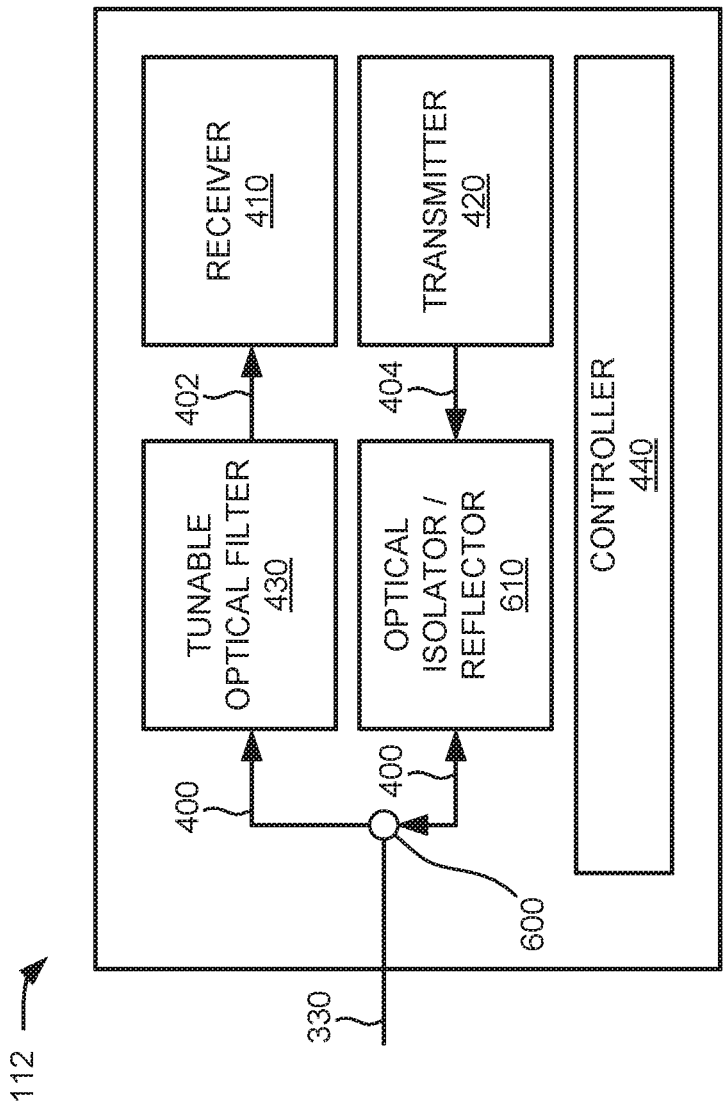
FIG. 6 is a simplified block diagram of the ONU of FIG. 2, according to another implementation.

FIG. 6 is a block diagram of ONU 112, according to another implementation. As shown in FIG. 6, ONU 112 may include receiver 410, transmitter 420, tunable optical filter 430, controller 440, a splitter 600, and an optical isolator/reflector 610. Receiver 410, transmitter 420, tunable optical filter 430, and controller 440 may include features described above in connection with FIG. 4.

Splitter 600 may receive incoming optical signals and transmit outgoing optical signals via one of optical fibers 330. Particularly, referring to the configuration of FIG. 3A, splitter 600 would receive and transmit optical signals over optical fibers 330-3 and 330-4. Splitter 600 may be a passive optical splitter. For example, splitter 600 may include a 1-to-2 fused biconic tapered splitter. Splitter 600 may cause incoming signals 400 to pass to both tunable optical filter 430 and optical isolator/reflector 610. Signals 400 that are passed to tunable optical filter 430 are managed as described above in connection with FIG. 4.

Optical isolator/reflector 610 may include a device that prevents incoming signals 400 passed through splitter 600 from reaching transmitter 420. Conversely, optical isolator/ reflector 610 permits transfer of outgoing signals 404 from transmitter 420 into optical network 140 (via splitter 600 and optical fibers 330). In one implementation, optical isolator/reflector 610 may function as an optical time-domain reflectometer (OTDR) trace reflector. That is incoming signals 400 may be reflected back from optical isolator/reflector 610 in a test mode to monitor conditions in optical network 140. Configuration settings and modes (e.g., test mode or normal mode) for optical isolator/reflector 610 may be implemented, for example, via controller 440.

In FIGS. 4 and 6, the depicted arrangement and number of components of ONU 112 are illustrated for simplicity. In practice, there may be more or fewer components that depicted in FIGS. 4 and 6. For example, ONU 112 may include components for routing, testing, monitoring, and other functions.

Figure 7:
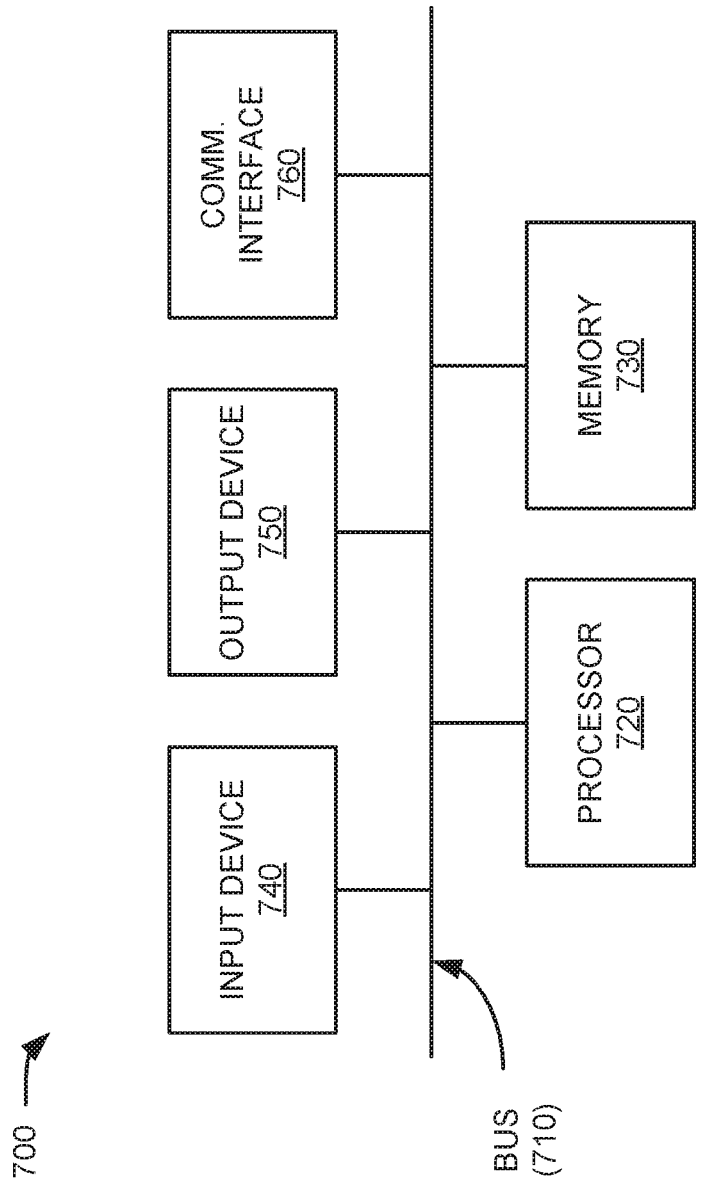
FIG. 7 is a diagram of exemplary components that may be included in the devices depicted in FIGS. 1 through 6.

FIG. 7 is a diagram of exemplary components that may be included in a device 700 associated with or included in environment 100, such as controller 440. As illustrated in FIG. 7, device 700 may include a bus 710, a processing unit 720, a memory 730, an input device 740, an output device 750, and a communication interface 760.

Bus 710 may permit communication among the components of device 700. Processor 720 may include one or more processors or microprocessors that interpret and execute instructions. In other implementations, processor 720 may be implemented as or include one or more application specific integrated circuits (ASICs), field programmable gate arrays (FPGAs), or the like.

Memory 730 may include a random access memory (RAM) or another type of dynamic storage device that stores information and instructions for execution by processor 720, a read only memory (ROM) or another type of static storage device that stores static information and instructions for the processor 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, one or more biometric mechanisms, and the like. Output device 750 may include a device that outputs information to the operator, such as a display, a speaker, etc.

Communication interface 760 may include optical device 110 to enable device 700 to communicate with optical network 140. Communication interface 760 may further include a transceiver (e.g., a transmitter and/or receiver) that enables device 700 to communicate with other devices and/or systems. For example, communication interface 760 may include mechanisms for communicating with other devices, such as other devices of environment 100 or another device 700.

As described herein, device 700 may perform certain operations in response to processor 720 executing software instructions contained in a computer-readable medium, such as memory 730. A computer-readable medium may be defined as a non-transitory memory device. A memory device may include space within a single physical memory device or spread across multiple physical memory devices. The software instructions may be read from memory 730, from another computer-readable medium or received from another device via communication interface 760 and stored in memory 730 or another computer readable medium. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows exemplary components of device 700, in other implementations, device 700 may include fewer components, different components, differently-arranged components, or additional components than depicted in FIG. 7. As an example, in some implementations, input device 740 and/or output device 750 may not be implemented by device 700. In these situations, device 700 may be a "headless" device that does not explicitly include an input or an output device. Alternatively, or additionally, one or more components of device 700 may perform one or more other tasks described as being performed by one or more other components of device 700.

Figure 8:
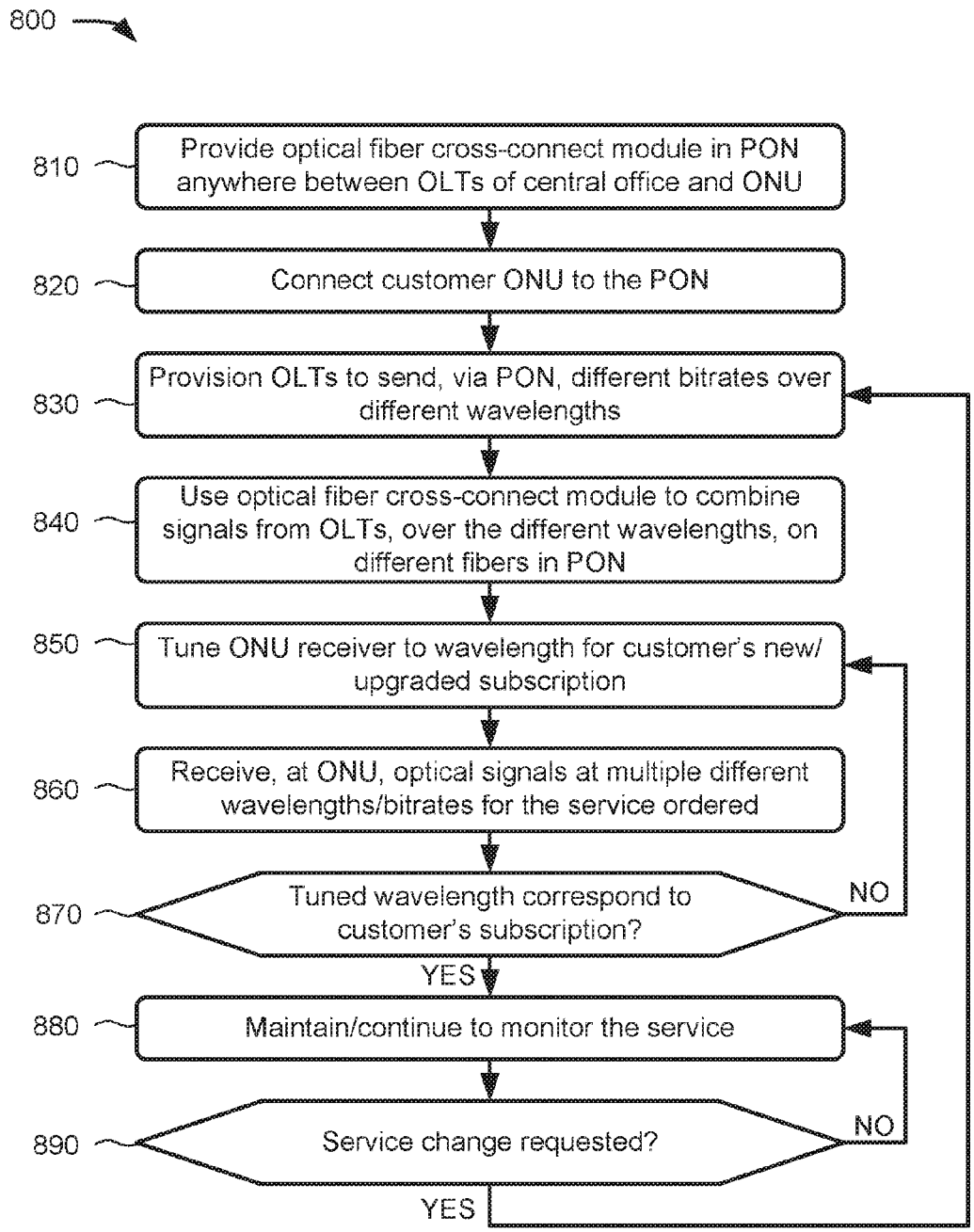
FIG. 8 is a flow diagram of an exemplary process for implementing an optical fiber cross-connect module in an optical network, according to an implementation described herein.

FIG. 8 is a flow chart of a process 800 for implementing an optical fiber cross-connect module in a PON, according to an implementation described herein. Process 800 may include providing an optical fiber cross-connect module in a PON anywhere between OLTs of a central office and an ONU (block 810). For example, as shown in FIG. 1, cross-connect module 130 may be provided within optical network 140. Cross-connect module 130 may be inserted along pathway 120 at central office 101, at customer premises 102 (e.g., at a fiber distribution hub 206, fiber distribution terminal 210, etc), or anywhere between central office 101 and customer premises 102 (e.g., a data center, etc.).

Process 800 may also include connecting a customer ONU to the PON (block 820). For example, ONU 112 on customer premises 102 may be connected to an optical fiber 330 of pathway 120 to enable reception of a default or configuration wavelength on ONU 112.

Process 800 may further include provisioning the OLTs to send, via the PON, different bitrates over different wavelengths (block 830). For example, one or more OLTs 110 may be configured to transmit optical signals over optical fibers 330 (e.g., optical fibers 330-1 and 330-2). OLTs 110 may provide different bitrates and/or protocols over different wavelengths. The different bitrates may correspond to different service subscription levels and the different protocols may correspond to different PON standards, such as Ethernet passive optical networking (EPON) or Gigabit passive optical networking (GPON).

Process 800 may also include using the optical fiber cross-connect module to combine signals from the OLTs, over the different wavelengths, on different fibers in the PON (block 840). For example, signals from optical fibers 330-1 and 330-2 may be split at cross-connect module 130 and merged in duplicate onto optical fibers 330-3 and 330-4 that provide the signals to ONU 112 at customer premises 102.

Process 800 may further include tuning the ONU receiver to a particular wavelength for a customer's subscription (block 850), receiving, at the ONU, optical signals over multiple different wavelengths with different bitrates for the ordered service (block 860), and determining if the tuned optical signal wavelengths correspond to the particular wavelength for the customer's subscription (block 870). For example, as part of an initial configuration or a service upgrade, a service technician may select a particular wavelength, for tunable optical filter 430, that is provisioned for a customer's subscription (e.g., to provide a particular bitrate and/or service). Tunable optical filter 430 may be tuned to a particular wavelength remotely (e.g., via a local or long-distance network connection) or manually, and tunable optical filter 430 associated with receiver 410 may receive signals over one of optical fibers 330-3 and 330-4. Tunable optical filter 430 may filter out wavelengths that do not correspond to the particular wavelength for a customer's subscription, as configured by the service technician. Tunable optical filter 430 may pass signals that correspond to the particular wavelength for a customer's subscription to receiver 410 for processing. Receiver 410 may include software to verify that signals/wavelengths from tunable optical filter 430 correspond to a customer's subscription.

If the tuned wavelength does not correspond to the particular wavelength for the customer's subscription (block 870—NO), process 800 may return to process block 850 to tune the ONU receiver. If the tuned wavelength corresponds to the particular wavelength for the customer's subscription (block 870—YES), process 800 may include maintaining the service and continuing to monitor the service (block 880). For example, tunable optical filter 430 of ONU 112 may continue to receive singles over one of optical fibers 330-3 and 330-4. Tunable optical filter 430 may continue to filter out wavelengths that do not correspond to the particular wavelength for a customer's subscription and pass signals that correspond to the particular wavelength for a customer's subscription to receiver 410. Receiver 410 may monitor the incoming signals to verify they are consistent with wavelengths and/or bitrates for the customer's subscription.

Process 800 may further include determining if a service change is requested (block 890). For example a customer may request a service upgrade for a higher bitrate or additional service provided via different wavelengths over optical network 140. If a service change is requested (block 890—YES), process 800 may return to process block 830 to provision the OLTs. If a service change is not requested (block 890—NO), process 800 may return to block 880 to continue to maintain and monitor services.

As described above, systems may include an optical fiber cross-connect module with multiple upstream ports and downstream ports, a first set of optical fibers connected from optical line terminals to the upstream ports, and a second set of optical fibers connected to the downstream ports and a customer optical network unit. The optical line terminals may be configured to provide multiple wavelengths carrying optical signals at different bitrates over the first set of optical fibers. The customer optical network unit may include a tunable filter configured to receive any one of the multiple wavelengths. The optical fiber cross-connect module may divide the optical signals received at each of the upstream ports into each of the downstream ports, and the customer optical network unit may be tuned to pass through a particular wavelength from the multiple wavelengths. Conversely, the optical fiber cross-connect module may divide optical signals received at each of the downstream ports into each of the upstream ports for delivery to the optical line terminals.

Systems described herein may enable dynamic wavelength selections in a more robust and simple manner than optical switch-based systems. Systems described herein may require less power than optical switches, as power is only required to select a wavelength change and then passively hold the selected configuration.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, while series of blocks have been described with respect to FIG. 8, the order of the blocks may be modified in other implementations. Further, non-dependent blocks may be performed in parallel.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

What is claimed is:

1. A system, comprising:
   optical line terminals;
   customer optical network units;
   an optical fiber cross-connect module including upstream ports and downstream ports;
   a first set of optical fibers connected from the optical line terminals to at least one of the upstream ports;
   a second set of optical fibers connected to at least one of the downstream ports and the customer optical network units;
   wherein the optical line terminals are configured to provide multiple wavelengths carrying optical signals at different bitrates over the first set of optical fibers; and
   wherein each of the customer optical network units including a tunable filter, the tunable filter comprising a linear or radial arrangement of tuning increments, the increments corresponding to a frequency grid for coarse wavelength division multiplexing signals,
   wherein the optical fiber cross-connect module includes a fiber mesh with a fiber splice at each of the upstream ports that divides the optical signals received at each of the upstream ports into a corresponding number of the downstream ports,
   wherein one of the upstream ports has a different signal ratio than other of the upstream ports, the one of the upstream ports being connected to an amplifier that boosts power for downstream signals traversing the second set of optical fibers, and
   wherein each of the customer optical network units is tuned to pass through a particular wavelength from the multiple wavelengths by positioning the linear or radial arrangement of the tuning increments.

2. The system of claim 1, wherein the optical fiber cross-connect module includes at least three upstream ports and at least three downstream ports.

3. The system of claim 1, wherein each of the upstream ports and each of the downstream ports of the optical fiber cross-connect module comprises a fused biconic tapered splitter.

4. The system of claim 1, wherein the optical fiber cross-connect module comprises a fusion splice at each of the downstream ports that connects each of the downstream ports to each of the upstream ports.

5. The system of claim 1, wherein the system includes no optical filters between the optical line terminals and the customer optical network units.

6. The system of claim 1, wherein the optical fiber cross-connect module comprises a multiple-fiber push-on (MPO) connector.

7. The system of claim 1, further comprising:
a signal insertion device connected to one of the upstream ports or one of the downstream ports of the optical fiber cross-connect module.

8. The system of claim 1, further comprising:
a signal monitoring device connected to one of the upstream ports or one of the downstream ports of the optical fiber cross-connect module.

9. The system of claim 1, wherein the tunable filter comprises one of:
a photodiode (PD) receiver, or
an avalanche photodiode (APD) receiver.

10. The system of claim 1, wherein the optical fiber cross-connect module, the first set of optical fibers, and the second set of optical fibers comprise a passive optical distribution network.

11. A method, comprising:
inserting an optical fiber cross-connect module in an optical network between optical line terminals (OLTs) and a customer optical network unit (ONU),
wherein the optical fiber cross-connect module includes upstream ports and downstream ports, and
wherein the customer ONU includes a tunable filter comprising a linear or radial arrangement of tuning increments, the increments corresponding to a frequency grid for coarse wavelength division multiplexing signals;
connecting the customer ONU to the optical network and tuning the tunable filter to a particular wavelength for a customer's subscription, wherein the tuning comprises positioning the linear or radial arrangement of the tuning increments;
provisioning the OLTs to send, via the optical network, different bitrates over different wavelengths;
using the optical fiber cross-connect module to combine signals from the OLTs, over the different wavelengths, on different fibers in the optical network;
connecting a signal amplifier to one of the upstream ports in the optical fiber cross-connect module, wherein the one of the upstream port has a different signal ratio than other of the upstream ports, the signal amplifier boosting power for downstream signals;
receiving, at the customer ONU, optical signals via the different wavelengths;
filtering out, by the customer ONU, the optical signals that have wavelengths that do not correspond to the particular wavelength for the customer's subscription; and
passing, by the customer ONU, the optical signals that have wavelengths that correspond to the particular wavelength for the customer's subscription.

12. The method of claim 11, further comprising:
injecting, via the optical fiber cross-connect module, signals into a portion of the optical network.

13. The method of claim 11, wherein the signal amplifier is located on customer premises.

14. The method of claim 11, further comprising:
connecting a tap line to one of the downstream ports in the optical fiber cross-connect module; and
monitoring, via the tap line, signals across a portion of the optical network.

15. The method of claim 11, wherein the inserting comprises:
connecting a first set of optical fibers between the OLTs and the upstream ports, and
connecting a second set of optical fibers between the downstream ports and the customer ONU.

16. The method of claim 11, wherein tuning the tunable filter to a particular wavelength for a customer's subscription includes selecting the particular wavelength from a set of wavelengths.

17. A network, comprising:
an optical fiber cross-connect module including upstream ports and downstream ports;
a first set of optical fibers connected from optical line terminals to the upstream ports;
a second set of optical fibers connected to the downstream ports and a customer optical network unit;
the optical line terminals being configured to provide multiple wavelengths carrying optical signals at different bitrates over the first set of optical fibers; and
the customer optical network unit including:
a receiver,
a transmitter, and
a tunable filter in series before the receiver and configured to tune to any one of the multiple wavelengths, the tunable filter comprising a linear or radial arrangement of tuning increments, the increments corresponding to a frequency grid for coarse wavelength division multiplexing signals,
wherein the optical fiber cross-connect module divides the optical signals received at each of the upstream ports into each of the downstream ports,
wherein one of the upstream ports has a different signal ratio than other of the upstream ports, the one of the upstream ports being connected to an amplifier that boosts power for downstream signals traversing the second set of optical fibers, and
wherein the customer optical network unit is tuned to pass through a particular wavelength from the multiple wavelengths by positioning the linear or radial arrangement of the tuning increments.

18. The network of claim 17, wherein the customer optical network unit further comprises:
an optical splitter that divides incoming signals from one of the second set of optical fibers, and
an optical isolator in series between the optical splitter and the transmitter.

19. The network of claim 18, wherein the optical isolator includes a reflector to provide trace reflections of signals received via the optical splitter.

20. The network of claim 17, wherein the optical fiber cross-connect module divides the optical signals received at each of the downstream ports into each of the upstream ports.

* * * * *